United States Patent [19]
Ruppert, Jr. et al.

[11] Patent Number: 5,697,677
[45] Date of Patent: Dec. 16, 1997

[54] BEARING SUPPORT PLATE FOR AXLE HOUSING

[75] Inventors: Malcolm F. Ruppert, Jr.; William C. Sullivan, both of Newark, Ohio

[73] Assignee: Rockwell Heavy Vehicle Systems, Inc., Troy, Mich.

[21] Appl. No.: 376,874

[22] Filed: Jan. 23, 1995

[51] Int. Cl.⁶ .................................................. B60G 9/00
[52] U.S. Cl. .................. 301/124.1; 301/137; 74/607
[58] Field of Search ........................... 301/124.1, 126, 301/131, 132, 137; 74/607, 606 R

[56] References Cited

U.S. PATENT DOCUMENTS

| | | | |
|---|---|---|---|
| 1,835,525 | 12/1931 | Robbins | 74/607 |
| 3,112,965 | 12/1963 | Popiel | 308/178 |
| 3,310,999 | 3/1967 | Griffith | 74/607 X |
| 5,259,271 | 11/1993 | Martin et al. | 74/606 |

FOREIGN PATENT DOCUMENTS

| | | |
|---|---|---|
| 603422 | 1/1926 | France . |
| 2124166 | 2/1984 | United Kingdom ............ 301/137 |
| 9623149 | 1/1996 | WIPO . |

*Primary Examiner*—Russell D. Stormer

[57] ABSTRACT

A modular axle assembly incorporates a separate bearing support plate which is received at an open end of an axle housing. The separate bearing support plate supports the bearing at the open end, and is received within the open end of the axle housing. In the prior art, the large helical cover typically also provided the bearing support. The use of the separate bearing support plate allows the modular assembly of the axle assembly and further facilitates repair. In another feature of this invention, a threaded adjustment member is associated with both the bearing at the open end of the differential, and also with the bearing at the other end of the differential. The threaded adjustment members allow the control of gear positioning and the pre-load on the bearings such that precise positioning and pre-load adjustment are easily obtainable.

14 Claims, 2 Drawing Sheets

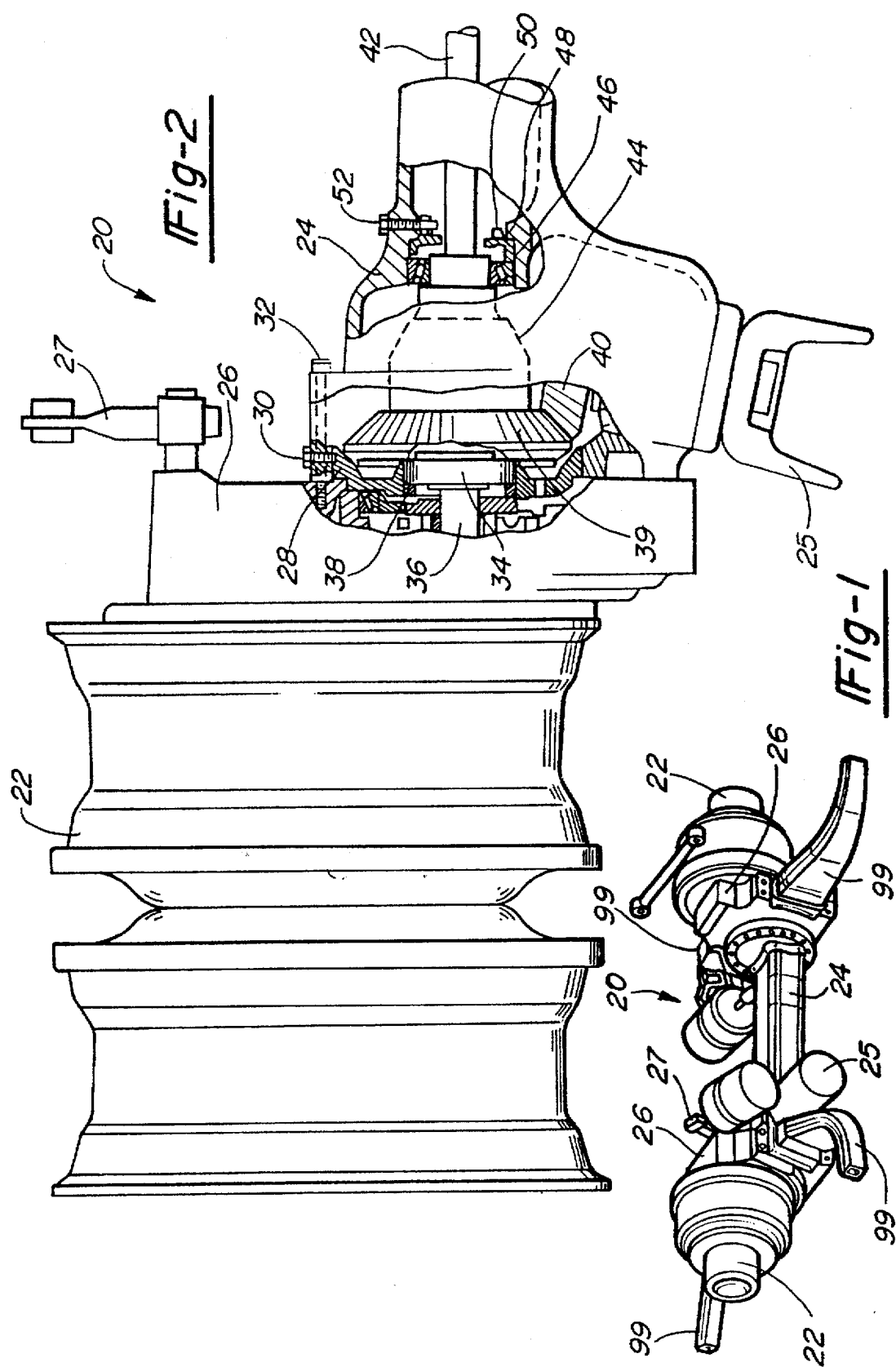

BEARING SUPPORT PLATE FOR AXLE HOUSING

BACKGROUND OF THE INVENTION

This invention relates to a support plate for a bearing in a differential axle housing. The support plate allows the assembly of the axle housing as a complete modular unit, and also simplifies the assembly.

In the prior art, axle housings are typically utilized to receive a power input from a source of rotation, and transmit that rotation to axles associated with the wheels at each lateral side of the vehicle. Typically, axle housings, or center housings, have surrounded the differential assembly. The drive source is offset from the center of the axle housing. The axle housing has a relatively small opening at one end that is only large enough to allow passage of an axle half. The differential bearing on that side may be mounted within the axle housing. The other end of the axle housing has an opening large enough for passage of the differential assembly. This end of the housing is referred to as the "open end" for purposes of this application. Typically, the drive source is spaced toward the open end. The gears associated with the differential assembly may be assembled into the housing through the open end.

In the prior art, once the gears have been inserted into the housing, a bearing must then be supported at the open end. It is also desirable to achieve a pre-load force on the bearing. In fact, precise control of the pre-load is an important variable in assembling the axle housing. The prior art has not been able to easily assemble the axle housings or achieve precise pre-load control.

In the prior art, a large housing, known as a helical cover has been placed upon the axle housing to close the open end. This large cover is connected to the brakes and other assemblies associated with the wheel, and is a massive heavy item.

The helical cover also provides the bearing support and bearing pre-load in the prior art. Thus, in the prior art, this large helical cover is the portion of the differential assembly which much achieve the pre-load on the outer bearing. Adjustment of the pre-load was achieved by placing precision spacers behind the bearing cup, which was located in the helical cover. The assembly has been difficult, and achievement of precise pre-loads has also been difficult with such an arrangement. Adjustment of the pre-load required disassembly of the helical cover from the axle housing, removal of the bearing cup, removal and adjustment of the precision spacer by choosing a spacer of a different thickness, reassembly of the spacer and the bearing cup into the helical cover, and then reattachment of the heavy helical cover to the axle housing. This process was repeated until a suitable pre-load of the bearing was achieved.

In addition, the use of the large helical cover to close the open end of the axle housing has made pre-assembly of the entire axle housing as a modular unit impractical. Moreover, repair has been difficult, since the assembly and disassembly of the large helical cover from the differential housing is a difficult and a complex procedure for most mechanics who would be performing such repairs.

SUMMARY OF THE INVENTION

In a disclosed embodiment of this invention, a separate plate is utilized to close the open end of an axle housing and support the bearing. The separate plate can be pre-assembled to the axle housing. Thus, the entire axle housing can be pre-assembled as a modular unit. Moreover, the assembly is relatively simple when compared to the prior art assembly of an axle housing.

The invention is particularly well-suited for use in an axle housing wherein the differential is mounted closer to one side of the housing than to the other. As discussed above, in such assemblies, a first end of the housing has a relatively small cross-section which may easily support the bearing for its associated differential half. At the other or open end, the axle housing has a relatively large opening such that the gears may be inserted into the housing. The housing open end requires a bearing support to be attached to the open end and support the bearing. The inventive use of a separate plate received within the open end and supporting the bearing facilitates assembly of the axle housing.

In one preferred embodiment of this invention, a portion of the support plate is adjustable towards and away from the bearing to adjust the pre-load provided by the plate on the bearing. In one particular embodiment, the adjustment portion of the plate is threadably adjustable to move towards and away from the bearing. In a most preferred embodiment of this invention, the adjustment portion is a separate ring found at the inner periphery of the support plate. The separate ring contacts the outer race of the bearing, and is adjustable relative to the remainder of the plate. Turning the separate ring brings it into contact with the bearing to allow precise control of the pre-load on the bearing.

In other features of this invention, a pin extends radially inwardly from the axle housing into the support plate to prevent rotation of the support plate relative to the axle housing. The axle housing may then be bolted to a helical cover, which performs the same function as the helical cover in the prior art at its outer periphery. The helical cover of the present invention does not extend radially inwardly to enclose the open end of the differential, as that function is now being performed by the separate plate.

In another feature of the present invention, the bearing at the opposed end of the axle housing from the open end also includes a threaded adjustable member for adjusting the pre-load on the bearing. For purposes of this application, this end will be referred to as the "closed" end, although it is not closed, but rather allows passage of an axle half. In one preferred embodiment, the threadably adjusted member is threadably adjustable relative to the axle housing towards and away from the outer race of the bearing to control the pre-load. In one most preferred embodiment, the threadably adjustable member has a plurality of ears that extend axially from a rearward face. The threadably adjustable member is adjusted to obtain the precise pre-load that is desired, and a screw is then brought radially inwardly through the axle housing to extend between the ears. The screw prevents rotation of the threadably adjustable member, thus locking the member at the desired position.

In a method according to the present invention, an axle assembly is assembled by initially placing a bearing into the open end of the axle housing, and supporting that bearing within the axle housing. The differential assembly is then inserted into the axle housing. A bearing at the outer or open end of the axle housing is then supported on a separate plate. The separate plate is then attached to the axle housing. In a preferred method according to the present invention, the pre-load on the bearing is then adjusted to a desired pre-load. After each of these steps have been performed, the fully assembled axle assembly may then be connected to the helical cover associated with the remainder of the wheel assembly. A simple tool or ring plate is bolted to the axle housing to replicate the holding force of the helical cover. The pre-load is then adjusted. When it is desired to connect the helical cover, the ring plate is removed. The helical cover then is connected.

With the inventive support plate, the assembly of this differential is relatively simple when compared to the prior art. Moreover, repair of the assembly is much simpler than with the prior art assemblies. Only simple tools and procedures are required.

These and other features of the present invention can be best understood from the following specification and drawings, of which the following is a brief description.

BRIEF DESCRIPTION OF THE DRAWINGS

FIG. 1 is a view of an axle assembly according to the present invention.

FIG. 2 is a partially cut-away view of a axle housing according to the present invention.

DETAILED DESCRIPTION OF A PREFERRED EMBODIMENT

Figure 3:
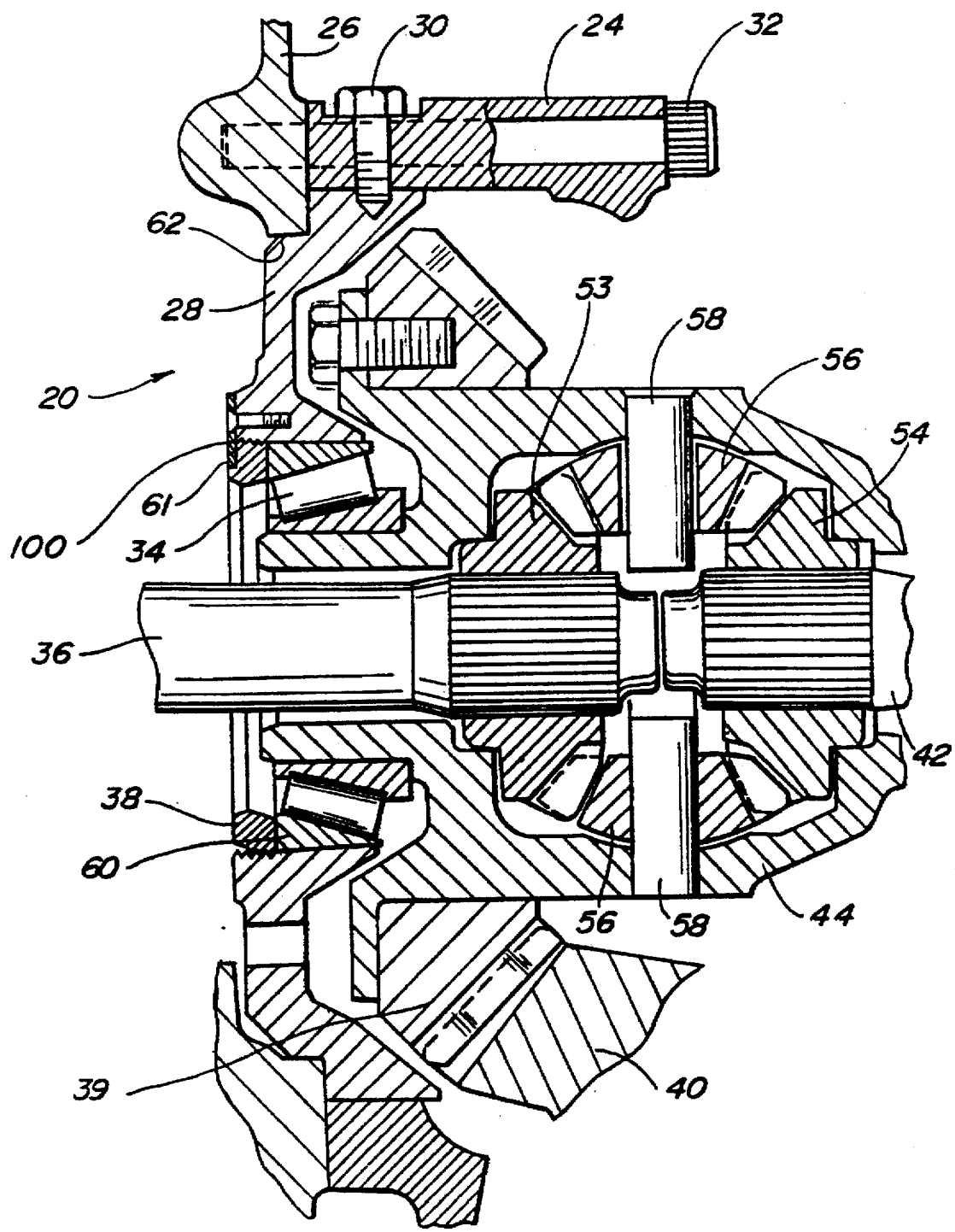
FIG. 3 is a cross-sectional view of a portion of the housing shown in FIG. 1.

An improved axle assembly 20 is illustrated in FIG. 1. Axle assembly 20 mounts wheel hubs 22 at each lateral side of the vehicle, and provides the drive force for those wheels. An axle housing 24 incorporates a differential drive for receiving a drive input, and splitting that drive input to axle halves leading to both wheel hubs 22. A helical cover 26 is received radially outwardly of the axle housing 24. As shown, the helical cover 26 is a massive item, and many other components are connected to the helical cover. As an example, the suspension brackets 99 are connected to the helical cover 26. The slack adjuster 27 and connecting members for the brake assembly also are attached to helical cover 26. In the prior art, this helical cover 26 has also enclosed and supported a bearing at the end of the axle housing 24 wherein the drive input 25 is located.

As shown in FIG. 2 with the present invention, a support plate 28 is received radially inwardly from the helical cover 26. The helical cover is an extremely heavy item, and the prior art use of this helical cover to support the bearing made assembly or repair of the axle housing 24 difficult.

Axle housing 24 includes bolt 30 extending radially inwardly into the outer periphery of support plate 28, holding support plate 28 against rotation relative to axle housing 24. Support plate 28 supports a bearing 34 at an open end of axle housing 24. An axle half 36 extends through bearing 34 to drive the wheel 22 on that side of the assembly. As will be explained better below, a threaded adjustment member 38 is threadably received at the inner periphery of support plate 28, and in contact with bearing 34. A drive input gear 39 receives a drive input from gear 40, which is operably associated with the drive source 25. An axle half 42 extends to the opposed side of the vehicle to drive wheels at that side.

A differential housing 44 surrounds a gear differential which transmits drive from the drive input gear 40 to the two axle halves 36 and 42. Although details of the gear differential will be explained below, the features of the gear differential are as known in the art. In general, a drive input gear 40 routes gear 39. Gear 39 is fixed to route with differential housing 44. As will be explained below, gears within differential housing 44 rotate drive gears associated with axle halves 36 and 42.

A bearing 46 supports differential 44. A threaded adjustment member 48 is threadably adjusted relative to an inner peripheral bore in the axle housing 24. A plurality of ears 50 extend rearwardly from the threaded adjustment member 48. At least one locking pin 52 extends radially inwardly through axle housing 24 to prevent further roUtion of adjustment member 48, once a desired pre-load is obtained on the outer race of bearing 46. Locking pin 52 prevents further roUtion of adjustment member 48, as further adjustment by rotation would cause ears 50 to contact locking pin 52. To adjust the pre-load on the bearing 46, one turns threaded adjustment member 48 towards and away from the outer race of bearing 46. This applies a pre-load through the bearing which is easily adjustable.

As can be seen from FIG. 1, axle housing 24 extends for a relatively great distance to the fight beyond the end of FIG. 2, before reaching the wheel at the opposed side of the vehicle. The axle housing 24 is configured such that the drive input and differential housing 44 are placed closer to one lateral side of the housing. In such an arrangement, the axle housing 24 is typically constructed such that the bearing 46 may be easily placed within a bore in the axle housing 24. The differential assembly 44 may then be easily placed within bearing 46. In the prior art, the remainder of the assembly became difficult. In the prior art, the large helical cover 26 had to be placed on the open end of the axle housing 24, supporting bearing 34. At the same time, the pre-load on the bearing 34 had to be somehow adjusted. As explained above, this was very difficult. Moreover, the helical cover 26 is so large as to make modular assembly of the axle housing impractical.

With the present invention, the assembly can initially proceed with regard to the bearing 46 and the differential housing 44 as described above. However, the assembly of the axle assembly 24 may be quickly completed using simple tools by placing bearing support plate 28 and bearing 34 within the open end of axle housing 24. Thus, the entire axle assembly 20 may be easily assembled as a modular unit.

The precise pre-load adjustment provided by adjustment members 38 and 48 also facilitate the ease of assembly of the axle assembly 24. Once the axle assembly 24 is fully assembled, the pre-load on the bearings 34 and 46 may be easily adjusted by rotating the threaded adjustment members 38 and 48. The adjustment members are also used to move gear 39 closer or further from gear 40. This positioning is beneficial in achieving proper meshing of the gears 39 and 40. It is only after the threaded adjustment member 38 is adjusted to obtain the precise desired pre-load on bearing 34 that the helical cover 26 is attached to the axle housing 24 by bolts 32.

Initially, a simple lightweight plate or tool is mounted in place of the helical cover. The pre-load is then adjusted. The plate replicates the holding force of the helical cover. the plate is removed prior to attachment of the helical cover.

Pin 52 is inserted radially inwardly through the axle housing 24 only after the threaded adjustment portion 48 is adjusted to achieve the desired pre-load on bearing 46. The threaded adjustment member 48 may be rotated by inserting a tool within the opening at the end of the axle housing 24 to the right as shown in FIG. 1. For purposes of this application, the end of the axle housing to the right is being referred to as the closed end, although it is open to the extent that axle half 42 extends through that end. The closed end of axle housing 24 does have a much smaller bore, and the open end of axle housing 24 to the left as shown in FIG. 1 has a larger bore. The large open end is required such that the differential casing 44 will fit into that end.

FIG. 3 shows further features of the axle assembly 20. As shown, gear 39 rotates with housing 44. As is known, the housing 44 rotates a plurality of cluster gears 56 through shafts 58. Gears 56 drive side gears 53 and 54 to rotate axle halves 36 and 42, respectively. This portion of the differential is as known and forms no portion of this invention.

As can be seen from FIG. 3, adjustment member 38 contacts the outer race 60 of bearing 34. By moving adjustment member 38 towards and away from outer race 60, one can adjust the pre-load on bearing 34. The adjustment of the pre-load is an important assembly factor in achieving a properly functioning axle assembly. The present invention makes the precise adjustment of this pre-load much easier than was possible in the prior art. A plate 61 is received in one of a plurality of notches 100 that are spaced circumferentially about adjustment member 38, outwardly of the threaded adjustment member 38, and bolted to the support plate 28. Plate 61 insures that an adjustment member 38 does not rotate and remains at the desired location.

The present invention makes modular assembly of the axle assembly 20 possible. The axle assembly 20 can be pre-assembled, and connected to the helical cover 28 whenever desired in the assembly process. Providing this versatility and simplifying the assembly steps is an important benefit. Moreover, the fact that the axle assembly 20 can be pre-assembled without connection to the helical cover 26 also facilitates the repair of the axle assembly 20 using only relatively simple tools.

As also shown in FIG. 3, the helical cover 26 includes a surface 62 that is supported radially outwardly of a surface of support plate 28. Support plate 28 is received radially inwardly of the open end of the axle housing 24. Thus, support plate 28 does not require any additional radial space. As also shown, support plate 28 does not extend outwardly of the axially outermost extent of helical cover 26. Thus, the support plate 28 does not require any additional axial space. As such, support plate 28 can be easily incorporated into axle assembly 20, without requiring any additional space.

Although support plate 28 is shown only constrained against rotation relative to axle housing 24, the support plate could be fixed by bolts or snap rings.

A preferred embodiment of this invention has been disclosed, however a worker of ordinary skill in the art would recognize that certain modifications would come within the scope of this invention. For that reason, the following claims should be studied to determine the true scope and content of this invention.

We claim:
1. An drive axle assembly comprising:
an axle housing surrounding a gear differential housing, said gear differential housing receiving an input gear assembly to be connected to a source of rotation, said input gear being associated with at least two output gears, each of said output gears being adapted to drive an axle half;
said axle housing having an open end large enough such that said differential housing can pass axially through said open end to be received within said axle housing;
an open end bearing mounted to support the differential half which is to extend through said open end of said housing;
a bearing support plate supporting said open-end bearing, said bearing support plate being received on said axle housing;
a closed side bearing received within said axle housing and supporting said differential at a side away from said open end of said housing, an adjustment member associated with said closed end bearing being operable to adjust the pre-load on said bearing;
said adjustment member associated with said closed end bearing being threadably adjustable relative to an inner peripheral bore of said axle housing to move towards and away from said closed end bearing to adjust the pre-load; and
said adjustment member associated with said closed end bearing includes a plurality of ears extending axially from said adjustment member, and a stop member extends radially through said axle housing, and is fixed to said axle housing to prevent further rotation of said adjustment member, once said adjustment member is at a desired location.

2. An axle assembly as recited in claim 1, wherein at least a portion of said bearing support plate is adjustable to adjust a pre-load on said open end bearing.

3. An axle assembly as recited in claim 2, wherein said portion is threaded, such that said portion may be turned to move toward and away from said open-end bearing to adjust said pre-load.

4. An axle assembly as recited in claim 3, wherein said portion is separate from the remainder of said bearing support plate, and is mounted within an inner peripheral bore of said bearing support plate.

5. An axle assembly as recited in claim 1, wherein said differential housing is positioned closer to said open end of said axle housing than it is to a remote end of said axle housing.

6. An axle assembly as recited in claim 5, wherein a helical cover is attached to said axle housing radially outwardly of said bearing support plate, and is a separate piece from said bearing support plate.

7. An axle assembly as recited in claim 6, wherein said helical cover is bolted to said axial housing.

8. An axle assembly as recited in claim 1, wherein said differential housing includes a central drive gear assembly operatively connected to side gears associated with each of the axle halves.

9. An axle assembly as recited in claim 1, wherein said bearing support plate is received radially inwardly of said open end of said axle housing.

10. An axle assembly as recited in claim 9, wherein said bearing support plate is connected against rotation on said axle housing by a securement member extending radially inwardly through said axle housing and into said bearing support plate.

11. A drive axle assembly as recited in claim 10, wherein a helical cover is connected to said axle housing, said helical cover having a portion supported radially outwardly on a portion of said bearing support plate, said helical cover being bolted to said axle housing.

12. An axle assembly comprising:
an axle housing surrounding a gear differential housing, said gear differential housing receiving an input gear to be connected to a source of rotation, said input gear being associated with at least two output gears, each of said output gears being adapted to drive an axle half;
said axle housing having an open end large enough such that said differential housing can pass axially through said open end to be received within said axle housing;
an open end bearing mounted to support the differential half which is to extend through said open end of said housing;
a bearing support plate supporting said open-end bearing, said bearing support plate being secured to said axle housing;

a threadably adjustable open end member for adjusting the pre-load on said open end bearing, said threadably adjustable open end member being in contact with an outer race of said open end bearing, and being movable and away from said outer race of said open end bearing to adjust the pre-load on said open end bearing;

a closed end bearing mounted at a second end of said axle housing for supporting an axle half which is to extend away from said open end of said axle housing;

a threadably adjustable closed end member associated with said closed end bearing, said adjustment closed end member being threadably adjustable to adjust the preload on said closed end bearing, said closed end adjustment member received within an inner bore of said axle housing, said closed end adjustable member including a plurality of ears extending axially away from the body of said closed end adjustable member, a closed end locking member extending radially through said axle housing, and being fixed to said axle housing to extend between spaced ones of said ears, and prevent rotation of said adjustable closed end member once a desired preload is achieved on said closed end bearing; and said open end bearing being provided with a plurality of radially spaced openings, and an open end locking plate being received in a selected one of said openings, and said open end locking plate being fixed to said bearing support plate, said open end locking plate preventing rotation of said open end bearing once a desired preload is achieved.

13. An axle assembly as recited in claim 12, wherein said closed end locking member is a threaded member which extends through a threaded opening in said axle housing.

14. An axle assembly as recited in claim 12, wherein said open end locking plate is bolted to said bearing support plate.

* * * * *